(12) United States Patent
Mu

(10) Patent No.: US 12,528,438 B2
(45) Date of Patent: Jan. 20, 2026

(54) AUXILIARY RELEASE DEVICE OF SAFETY BELT BUCKLE

(71) Applicant: SHENZHEN GLAMORTECH INDUSTRIAL CO., LTD, Shenzhen (CN)

(72) Inventor: Pengbo Mu, Shenzhen (CN)

(*) Notice: Subject to any disclaimer, the term of this patent is extended or adjusted under 35 U.S.C. 154(b) by 74 days.

(21) Appl. No.: 18/674,998

(22) Filed: May 27, 2024

(65) Prior Publication Data

US 2025/0282322 A1 Sep. 11, 2025

(30) Foreign Application Priority Data

Mar. 5, 2024 (CN) .......................... 202410250131.9
Mar. 5, 2024 (CN) .......................... 202420421753.9

(51) Int. Cl.
*B60R 22/32* (2006.01)
(52) U.S. Cl.
CPC .................................. *B60R 22/32* (2013.01)
(58) Field of Classification Search
CPC . B60R 22/32; A44B 11/2511; A44B 11/2546; A44B 11/2549; B25B 27/0035; B25B 27/00; B25B 27/02; B25B 7/02
See application file for complete search history.

(56) References Cited

U.S. PATENT DOCUMENTS

| 42,918 A | * | 5/1864 | X | A01L 11/00 30/186 |
|---|---|---|---|---|
| 96,453 A | * | 11/1869 | X | B26F 1/36 30/364 |
| 156,231 A | * | 10/1874 | X | B26F 1/36 30/363 |
| 3,039,159 A | * | 6/1962 | Burke | A47D 15/00 248/231.51 |
| 5,050,277 A | * | 9/1991 | Jimenez | A44B 11/2511 24/633 |
| 6,158,686 A | * | 12/2000 | Lawrence | B65H 54/58 242/129 |

(Continued)

FOREIGN PATENT DOCUMENTS

CN 209107652 U * 7/2019
CN 221541490 U * 8/2024

(Continued)

*Primary Examiner* — Jack W Lavinder
*Assistant Examiner* — Matthew J Sullivan
(74) *Attorney, Agent, or Firm* — SOROKER AGMON NORDMAN

(57) ABSTRACT

The present application provides an auxiliary release device of safety belt buckle, which comprises a bracket, a lever arm and a connecting shaft component, wherein the bracket comprises a U-shaped or C-shaped bracket body and a bracket gripping handle; the lever arm comprises a lever arm gripping handle and an extension portion; the bracket body comprises a bracket pivot hole, the extension portion comprises a lever arm pivot hole, the bracket and the lever arm are hinged at the positions of the bracket pivot hole and the lever arm pivot hole via the connecting shaft component. The auxiliary release device of safety belt buckle assists in releasing a seat belt buckle by utilizing a lever principle, and can protect the user, so as to achieve an effect of releasing a seat belt buckle with less effort.

9 Claims, 7 Drawing Sheets

(56) References Cited

U.S. PATENT DOCUMENTS

| | | | | |
|---|---|---|---|---|
| 6,421,900 | B1 * | 7/2002 | Hunt | B21J 15/386 |
| | | | | 269/6 |
| D506,115 | S * | 6/2005 | King | D8/54 |
| 8,539,862 | B1 * | 9/2013 | Robinson | B60R 22/00 |
| | | | | 81/463 |
| 9,527,129 | B2 * | 12/2016 | Chen | B21J 15/043 |
| 10,213,910 | B2 * | 2/2019 | Davison | B60N 2/2816 |
| 10,271,617 | B2 * | 4/2019 | Riley-Carter | A44B 11/2549 |
| 10,342,298 | B2 * | 7/2019 | Riley-Carter | A44B 11/2549 |
| 10,500,702 | B2 * | 12/2019 | Davison | B60N 2/2816 |
| 10,791,801 | B2 * | 10/2020 | Lambarth | B25B 27/0035 |
| 10,994,396 | B2 * | 5/2021 | Davison | B60R 22/32 |
| 11,678,726 | B2 * | 6/2023 | Riley-Carter | A44B 11/2546 |
| | | | | 24/633 |
| 12,291,285 | B1 * | 5/2025 | Ragan | B62D 35/001 |
| 2011/0308057 | A1 * | 12/2011 | Abrams | B60N 2/2816 |
| | | | | 29/270 |
| 2016/0166014 | A1 * | 6/2016 | Soenen | A44B 11/2526 |
| | | | | 24/639 |
| 2018/0116344 | A1 * | 5/2018 | Riley-Carter | A44B 11/2546 |
| 2018/0132571 | A1 * | 5/2018 | Lambarth | A44B 11/2526 |
| 2018/0161961 | A1 * | 6/2018 | Kopacz, Jr. | B25B 7/02 |
| 2018/0249791 | A1 * | 9/2018 | Riley-Carter | A44B 11/2549 |
| 2019/0343240 | A1 * | 11/2019 | Riley-Carter | A44B 11/2546 |

FOREIGN PATENT DOCUMENTS

| | | | | |
|---|---|---|---|---|
| CN | 119142287 A | * | 12/2024 | B60R 22/00 |
| FR | 2395760 A1 | * | 1/1979 | |

* cited by examiner

AUXILIARY RELEASE DEVICE OF SAFETY BELT BUCKLE

TECHNICAL FIELD

The present application relates to the technical field of vehicles, in particular to an auxiliary release device of safety belt buckle.

BACKGROUND ART

In people's lives, as the car ownership rate is increasing, the demand and probability of children riding cars are also higher and higher. Children need children's seats when riding cars. In order to avoid potential safety hazards caused by children opening the seat belt switches of children's seats by themselves, the switches of children's seats are designed in a way that they can't be opened without applying strong force, so as to prevent children from opening the switches by themselves; however, this design also brings problems, for example, the switches are also difficult to be opened by adults, opening the switches requires strong force, it is inconvenient to apply force on the switches, and the nails may be damaged easily. In order to solve the above problems, an auxiliary release device of safety belt buckle is developed.

All available auxiliary release devices of safety belt buckle in the market are all integral and employ internal shear structures. These devices utilize the elastic deformation of a plastic cement to open so as to increase a clamping space. These devices are not easy to use because they have to be opened by people with large force; the plastic cement has limited elastic deformation and may have plastic deformation; moreover, the plastic cement will be broken and damaged after several plastic deformations.

SUMMARY OF THE INVENTION

In view of the above problems and the defects in the prior art, an embodiment of the present application provides an auxiliary release device of safety belt buckle, which is easy to use, safe, durable and labor-saving, in order to solve problems with the existing release devices that are inconvenient to use and broken off easily.

To attain the above object, the present disclosure employs the following technical solution:

An auxiliary release device of safety belt buckle, comprising a bracket, a lever arm and a connecting shaft component, wherein the bracket comprises a U-shaped or C-shaped bracket body and a bracket gripping handle, the bracket body is substantially arranged at an angle of 90° with respect to the bracket gripping handle;

the lever arm comprises a lever arm gripping handle and an extension portion, the lever arm gripping handle is substantially arranged at an angle of 90° with respect to the extension portion;

the bracket body is provided with a bracket pivot hole, the bracket pivot hole is arranged on a first side of the bracket body where the bracket body is connected with the bracket gripping handle;

the extension portion is provided with a lever arm pivot hole, the lever arm pivot hole is arranged at a first end of the extension portion where the extension portion is connected with the lever gripping handle; and the bracket and the lever arm are hinged at the positions of the bracket pivot hole and the lever arm pivot hole via the connecting shaft component, so that the bracket gripping handle and the lever arm gripping handle are located at the same side of the bracket body, a second end of the extension portion and the bracket gripping handle are located at the same side of the first end of the extension portion, and the second end of the extension portion away from the first end of the extension portion can enter the U-shaped or C-shaped space of the bracket body.

Furthermore, the bracket is provided with a perforation arranged on the first side of the bracket body, and a portion between the first end of the extension portion and the second end of the extension portion can pass through the perforation entirely.

Furthermore, the extension portion is connected with the lever arm gripping handle on an outer surface of the extension portion, the second end of the extension portion is provided with a protrusion, and the protrusion is connected with the extension portion on an inner surface of the extension portion.

Furthermore, the protrusion extends from the inner surface of the extension portion into the U-shaped or C-shaped space of the bracket body.

Furthermore, the protrusion is substantially arranged at an angle of 90° with respect to the extension portion, so that the extension direction of the protrusion is substantially parallel to the extension direction of the lever arm gripping handle.

Furthermore, a terminal end of the protrusion is provided with a flexible pad.

Furthermore, the bracket pivot hole is arranged at a position away from a terminal end of the first side of the bracket body, and the terminal end of the first side of the bracket body terminates the first side of the bracket body.

Furthermore, the length of the lever arm gripping handle is greater than the length of the extension portion.

Furthermore, the length of the lever arm gripping handle is equal to the length of the bracket gripping handle.

Furthermore, the lever arm gripping handle bends towards a direction away from the bracket gripping handle.

The embodiments of the present disclosure achieve the following beneficial effects:

The present disclosure relates to an auxiliary release device of safety belt buckle for a child seat, comprising three parts: a bracket, a lever arm and a connecting shaft component. The bracket and the lever arm are combined to form a clamping space, and an included angle between the bracket and the lever arm is reduced by utilizing the lever principle, and the clamping space between the bracket and the lever arm is reduced at the same time; the device plays a role of triggering the seat belt switch to open the seat belt. By changing the force application direction of the user, the device provides functions of protecting the user, facilitating the operation outside the car door and saving labor.

Firstly, the bracket provides a function of supporting the bottom of the safety belt buckle, and the connecting shaft component provides a function of connecting the bracket and the lever arm, allowing the bracket and the lever arm to move relatively around the connecting shaft component with the connecting shaft component as the rotating center at the same time.

Secondly, the lever arm is hinged on the pivot shaft and rotates around the pivot shaft; an end of the lever arm is provided with a protrusion, and the protrusion presses on the switch on the child's seat belt buckle to form a clamping force with the bracket, so as to force the buckle switch to move downward to open the switch.

Compared with the prior art, the advantages of the present disclosure include:
1. The device is convenient for an adult to operate at a side of the child seat, and even allows the adult to operate outside the car if the internal space of the car is small;
2. Lever is used to save labor and it is easy to operate;
3. A protrusion is added on the device to increase the lever length, achieving an anti-slip effect, and preventing the child seat belt buckle from being scratched.

To make the above objects, features and advantages of the present application more obvious and easier to understand, some preferred embodiments will be made and detailed in the following in conjunction with the accompanying drawings.

BRIEF DESCRIPTION OF DRAWINGS

In order to explain the technical solutions in the embodiments of the present application more clearly, the accompanying drawings used in the embodiments will be introduced below briefly. It can be understood that the accompanying drawings described below only illustrate some embodiments of the present application, and should not be deemed as constituting any limitation to the scope of the present disclosure. Those having ordinary skills in the art can obtain other related drawings based on these drawings without expending any creative labor.

Figure 1:
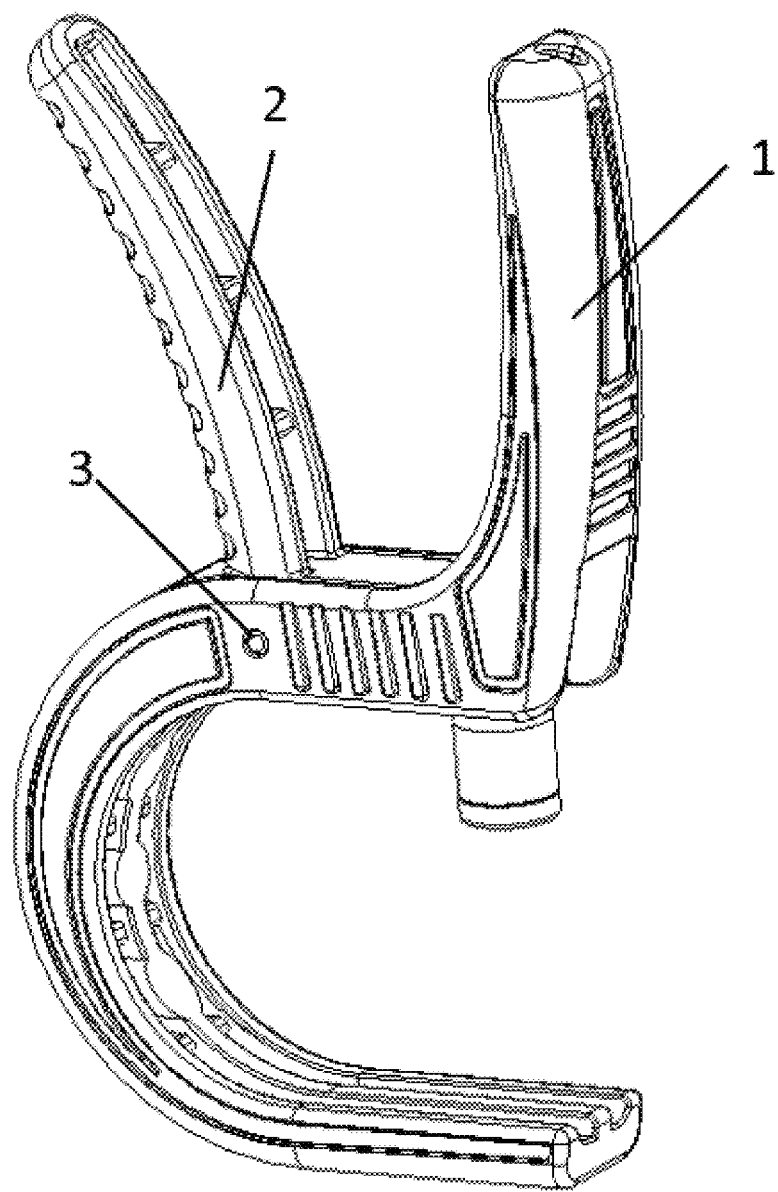
FIG. 1 shows a schematic structural diagram of the auxiliary release device of safety belt buckle provided in an embodiment of the present application.
Figure 2:
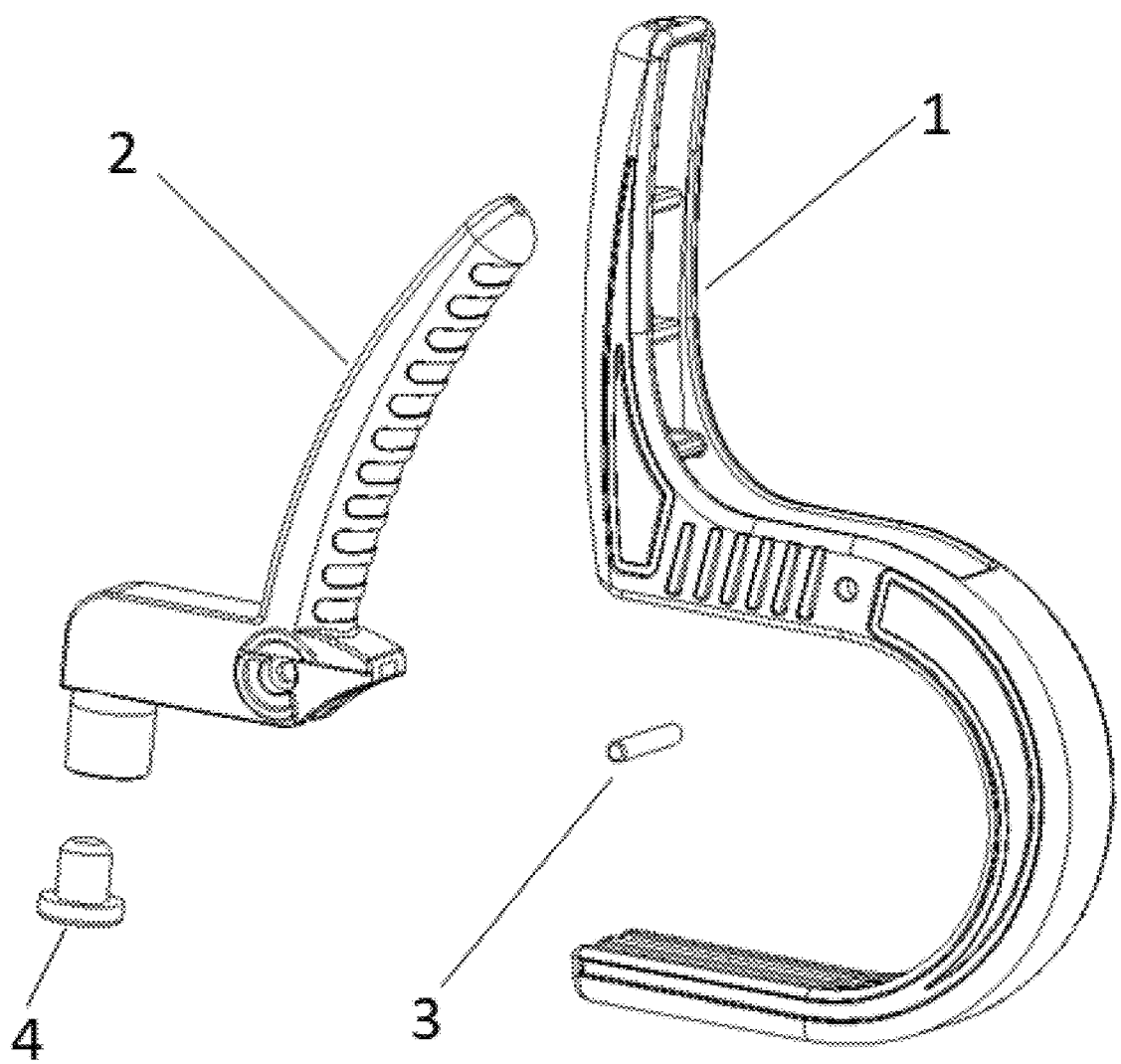
FIG. 2 shows an exploded view of the structure of the auxiliary release device of safety belt buckle shown in FIG. 1.

Reference Numbers in figures:
1—bracket; 101—bracket body; 102—bracket gripping handle; 103—bracket pivot hole; 104—bracket perforation; 105—bracket rope hole; 106—first side of bracket body; 107—second side of bracket body;
2—lever arm; 201—lever arm gripping handle; 202—extension portion; 203—lever arm pivot hole; 204—protrusion; 205—flexible pad fixing slot; 206—first end of extension portion; 207—second end of extension portion;
3—connecting shaft component; 301—sliding ring;
4—flexible pad; 401—flat surface of lower end; 407—flexible pad fixing column;
5—seat belt buckle.

DETAILED DESCRIPTION OF EMBODIMENTS

To make the object, technical solution, and advantages of the embodiments of the present application understood more clearly, hereunder the technical solution in the embodiments of the present application will be detailed clearly and completely, with reference to the accompanying drawings in the embodiments of the present application. Apparently, the embodiments described here are some embodiments of the present application rather than all embodiments of the present application.

On that basis, some embodiments of the present application will be described in detail in conjunction with the accompanying drawings. The following embodiments and the features in the embodiments can be combined with each other if no conflict exists.

Please refer to FIGS. 1 to 8. The auxiliary release device of safety belt buckle provided in an embodiment of the present application comprises a bracket 1, a lever arm 2 and a connecting shaft component 3 that hinges the bracket 1 and the lever arm 2 together, wherein the bracket 1 comprises a bracket body 101 and a bracket gripping handle 102, the bracket body 101 is substantially arranged at an angle of 90° with respect to the bracket gripping handle 102, and the bracket body 101 may be U-shaped or C-shaped.

Figure 4:
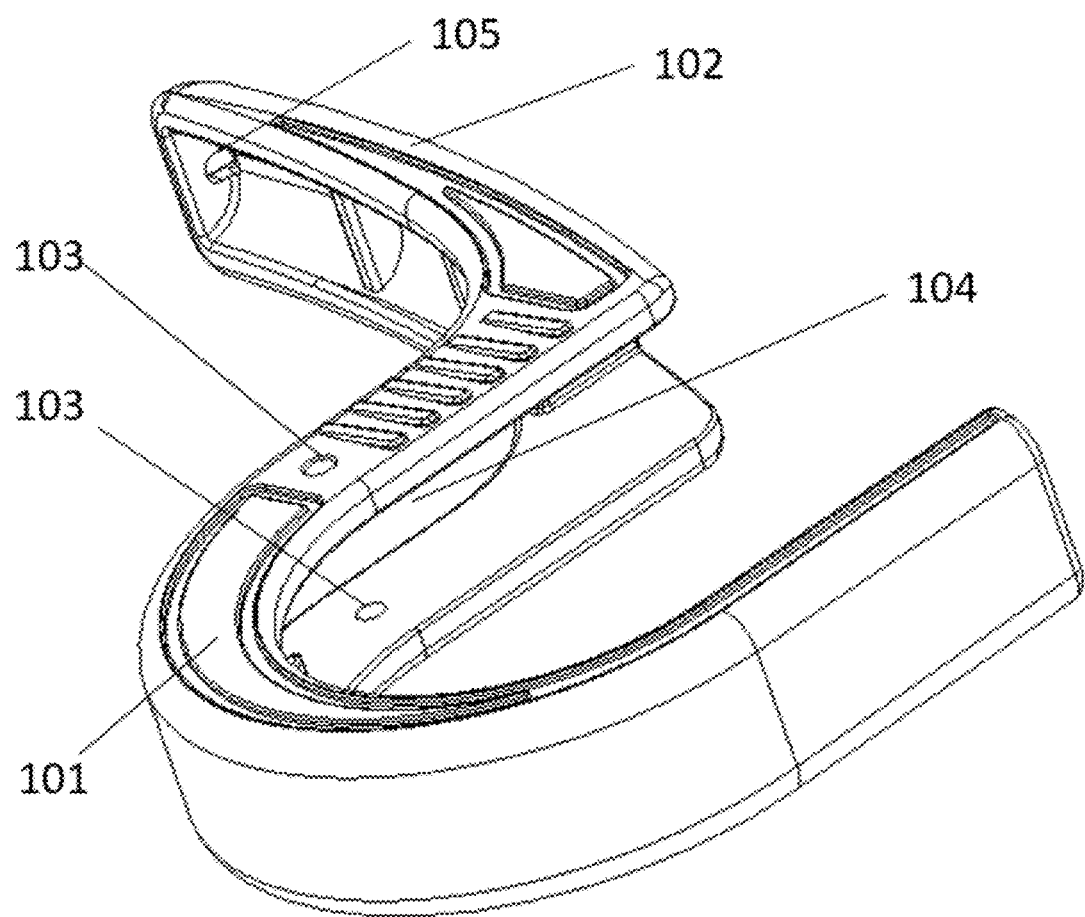
FIG. 4 shows a schematic structural diagram of the bracket provided in an embodiment of the present application.

Please refer to FIG. 4. In some optional embodiments, the bracket gripping handle 102 is connected with the bracket body 101 at a position of a first side 106 of the bracket body of the bracket body 101, and a side opposite to the first side 106 of the bracket body is a second side 107 of the bracket body.

In some optional embodiments, the end of the bracket gripping handle 102 may be provided with a bracket rope hole 105, and the user may hang the auxiliary release device of safety belt buckle in the car by threading a rope through the bracket rope hole 105, so that the device can be obtained and used conveniently at any time.

Figure 5:
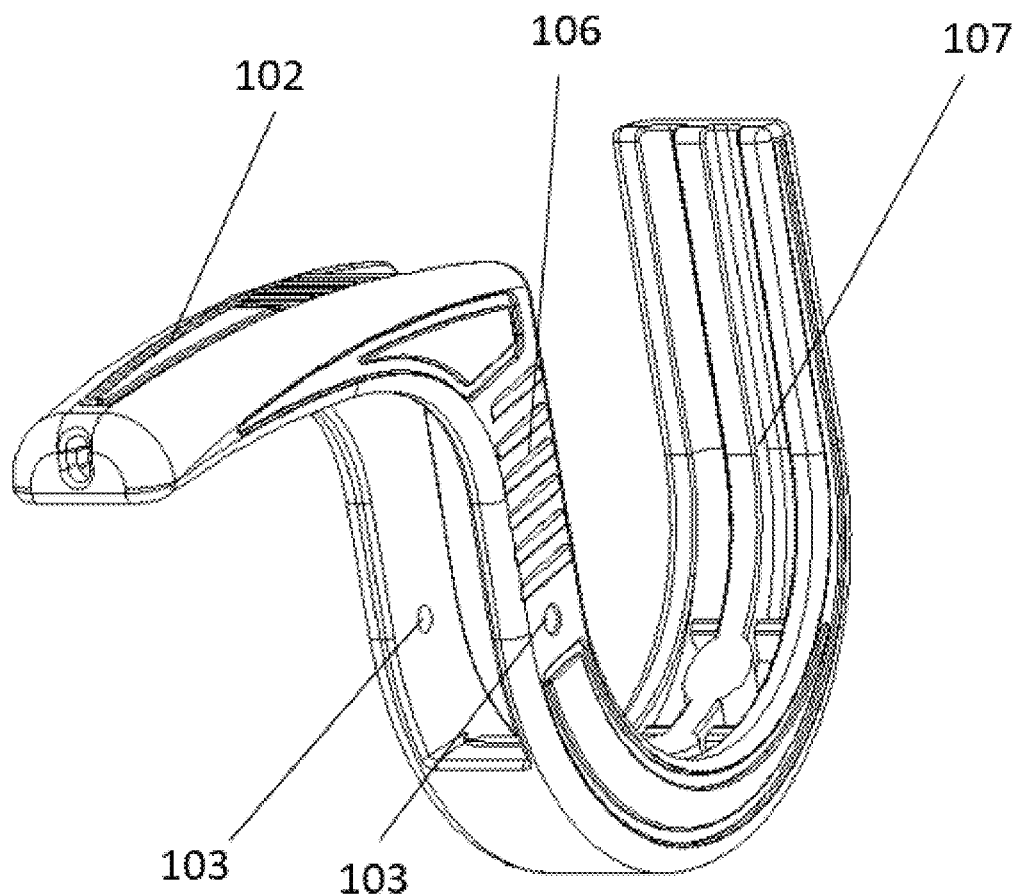
FIG. 5 shows a schematic structural diagram of the bracket shown in FIG. 4 viewed from another viewing angle.

Please further refer to FIG. 5. The first side 106 of the bracket body is provided with a bracket pivot hole 103.

Figure 6:
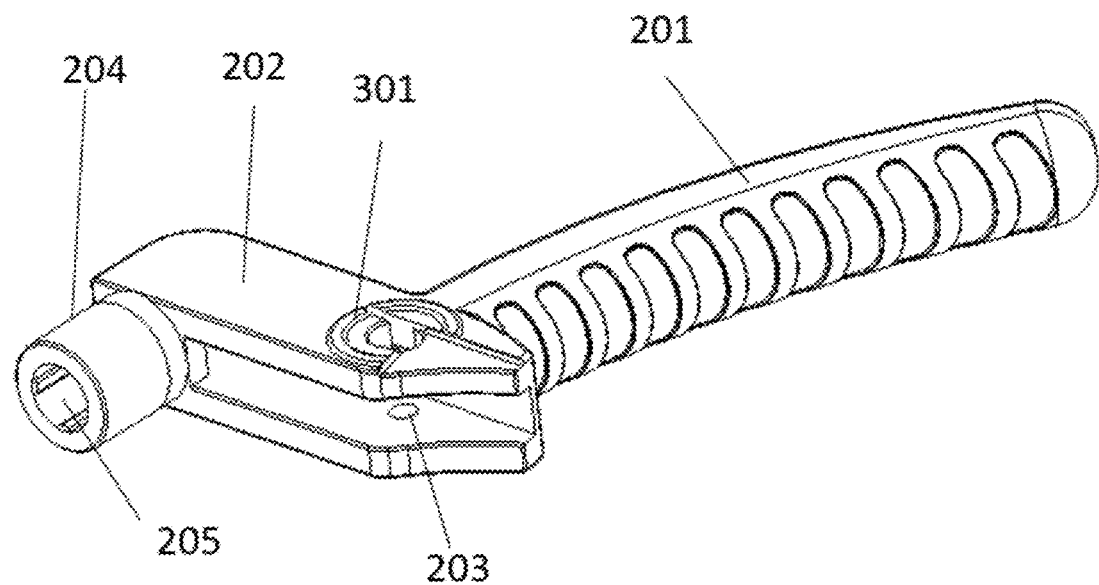
FIG. 6 shows a schematic structural diagram of the lever arm provided in an embodiment of the present application.

Please refer to FIG. 6. In some optional embodiments, the lever arm 2 comprises a lever arm gripping handle 201 and an extension portion 202, the lever arm gripping handle 201 is substantially arranged at an angle of about 90° with respect to the extension portion 202, and a maximum force arm is obtained so as to obtain a maximum torque.

In some optional embodiments, a sliding ring 301 may be provided in the lever arm pivot hole 203; the connecting shaft component 3 contacts the sliding ring 301 when passing through the lever arm pivot hole 203 so as to achieve a better sliding effect.

Figure 7:
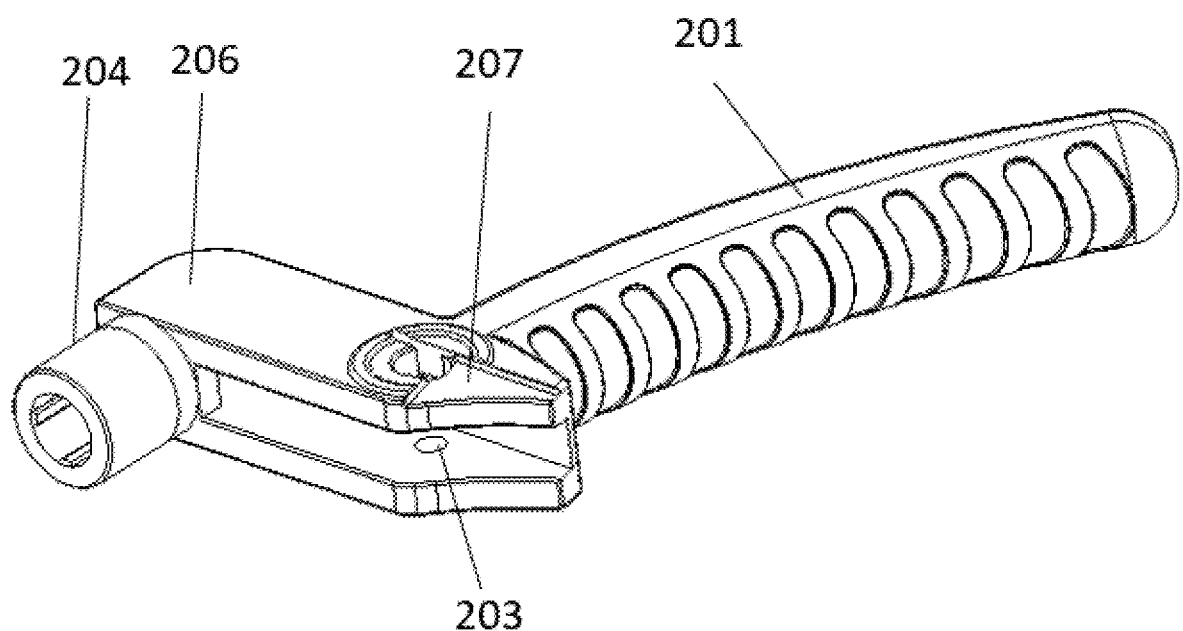
FIG. 7 shows a schematic structural diagram of the lever arm provided in another embodiment of the present application.
Figure 8:
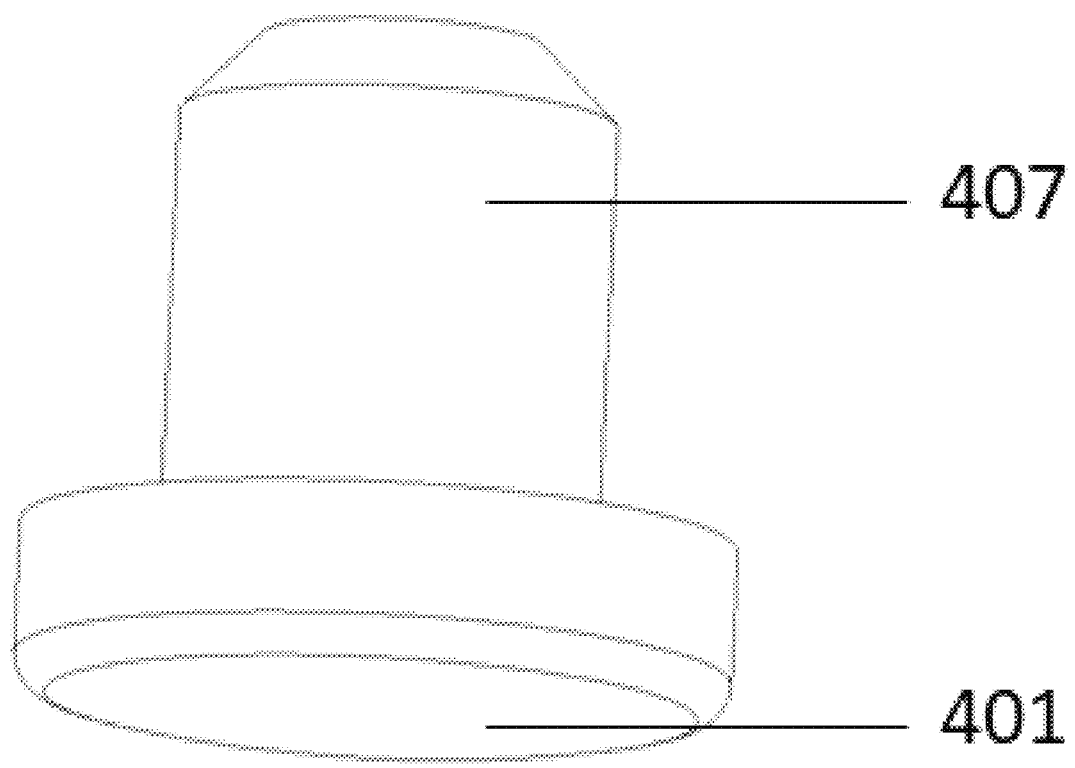
FIG. 8 shows a schematic structural diagram of the flexible pad provided in an embodiment of the present application.

Please refer to FIG. 7. In some optional embodiments, the extension portion 202 is connected with the lever arm gripping handle 201 at a first end 207 of extension portion of the extension portion 202, and an end of the extension portion 202 opposite to the first end 206 of extension portion is a second end 206 of extension portion, and the first end 207 of extension portion is provided with the lever arm pivot hole 203.

The connecting shaft component 3 may be a metal connecting shaft, and the metal connecting shaft passes through the bracket pivot hole 103 and the lever arm pivot hole 203 at the same time, so that the bracket 1 and the lever arm 2 are hinged at the bracket pivot hole 103 and the lever arm pivot hole 203, and the bracket gripping handle 102 and the lever arm gripping handle 201 are located at the same side of the bracket body 101, and the second end 207 of extension portion and the bracket gripping handle 201 are located at the same side of the first end of extension portion. The user may hold the bracket gripping handle 102 and the lever arm gripping handle 201 at the same time to make the two move relative to each other, so that the second end 207 of extension portion is brought to enter the U-shaped or C-shaped space of the bracket body 101.

Please refer to FIG. 4. In some optional embodiments, the first side 106 of bracket body is provided with a bracket perforation 104, and a portion between the first end 206 of extension portion and the second end 207 of the extension portion may pass through the bracket perforation 104 entirely. It can be understood that other hinge ways may also be used, for example, the hinge way of the hinge shaft of common scissors may be used to realize the hinge of the present application, and a direct hinge may be used by omitting the bracket perforation 104. There is no particular restriction on the hinge ways in the present application.

Please refer to FIGS. 2 to 8. The extension portion 202 is connected with the lever gripping handle 201 on the outer surface of the extension portion 202. In some optional embodiments, the second end 207 of extension portion is provided with a protrusion 204, the protrusion 204 is connected with the extension portion 202 on the inner surface of the extension portion; the outer surface of the extension portion is opposite to the inner surface of the extension portion. On the basis that the second end 207 of extension portion enters the U-shaped or C-shaped space of the bracket body 101, the protrusion can further increase the length into the space, and reduce the required amount of turning by the user to hold the bracket gripping handle 102 and the lever arm gripping handle 201, thereby less effort is required and the use efficiency of the auxiliary release device of safety belt buckle is improved.

In some optional embodiments, the end of the protrusion 204 is further provided with a flexible pad fixing slot 205 for fixing the flexible pad 4, and a flexible pad fixing column 407 of the flexible pad 4 can be directly clipped into the flexible pad fixing slot 205 to realize the fixation of the flexible pad 4. The flexible pad 4 can further extend the length of the protrusion and reduce the required amount of turning by the user to hold the bracket gripping handle 102 and the lever arm gripping handle 201, thereby less effort is required and the use efficiency of the auxiliary release device of safety belt buckle is further improved. In addition, the flexible pad 4 can protect the seat belt buckle from being scratched. Finally, the flexible pad 4 can provide friction resistance, so that the seat belt buckle can be clamped with the auxiliary release device of safety belt buckle more tightly to prevent slipping.

Please refer to FIGS. 5 and 6, the protrusion 204 extends from the inner surface of the extension portion into the U-shaped or C-shaped space of the bracket body 101.

Furthermore, the protrusion 204 is substantially arranged at an angle of 90° with respect to the extension portion 202, at this time, the extension direction of the protrusion 204 is substantially parallel to the extension direction of the lever arm gripping handle 201, so that the effect that the portion of the second end 207 of extension portion into the U-shaped or C-shaped space of the bracket body 101 can be extended to the greatest extent is achieved, and the required amount of turning by the user to hold the bracket gripping handle 102 and the lever arm gripping handle 201 can be reduced, thereby less effort is required and the use efficiency of the auxiliary release device of safety belt buckle is improved.

In some optional embodiments, the bracket pivot hole 103 is located at a position away from the terminal end of the first side of bracket body, wherein the terminal end of the first side of bracket body terminates the first side of bracket body. Since the bracket pivot hole 103 is arranged away from the terminal end of the first side of bracket body, a lever force arm of the lever formed by the bracket 1 and the lever arm 2 can be extended to the greatest extent, thereby less effort is required.

In some optional embodiments, the length of the lever arm gripping handle 201 is greater than the length of the extension portion 202, thereby a better torque can be obtained and the device is more labor-saving since the user exerts force on the end of the lever arm gripping handle 201.

Furthermore, the length of the lever arm gripping handle 201 is equal to the length of the bracket gripping handle 102, thereby the user obtains a better gripping experience.

Furthermore, the lever arm gripping handle 201 may slightly bend towards a direction away from the bracket gripping handle 102 so as to be arranged with a more ergonomic arc. Thus, the distance between the lever arm gripping handle 201 and the bracket gripping handle 102 can be increased, and the rotation space between the bracket 1 and the lever arm 2 can be increased so as to avoid a too small space causing the unable opening of the seat belt buckle.

Figure 3:
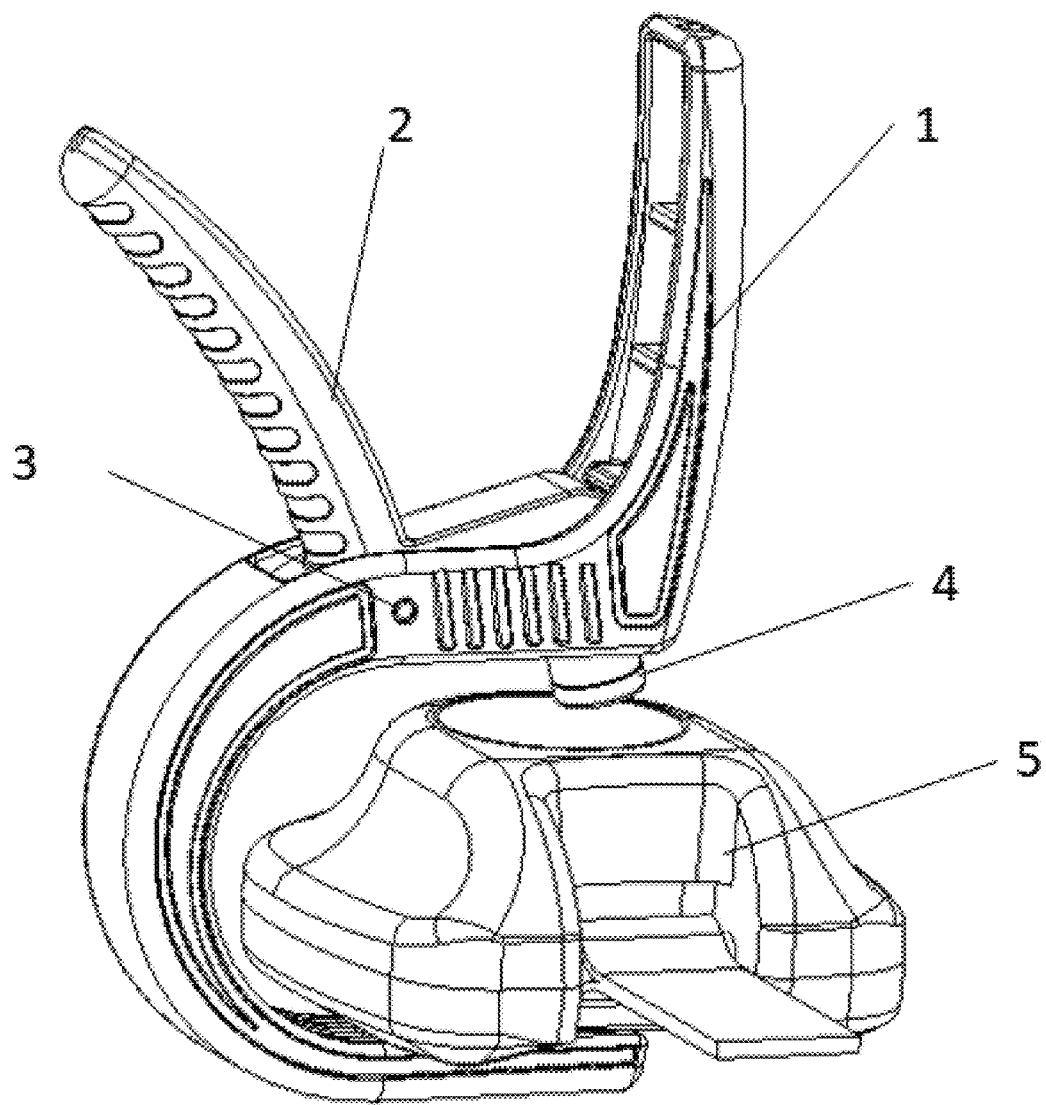
FIG. 3 show a schematic diagram of the auxiliary release device of safety belt buckle in use status provided in an embodiment of the present application.

Method of Use:

Please refer to FIG. 3. The bracket 1 and the handle 2 are connected via the connecting shaft component 3, and the bracket 1 and the handle 2 rotate around the connecting shaft component 3 with respect to each other; a clamping space is formed between the second side 107 of bracket body and the flexible pad 4. The switch of the seat belt buckle 5 is triggered to release the seat belt buckle by reducing the clamping space through the relative rotation of the bracket gripping handle 102 and the lever arm gripping handle 201.

The seat belt buckle 5 is placed in the clamping space when in use, and the second side 107 of bracket body supports the lower surface of the seat belt buckle 5, and a flat surface 401 of the lower end of the flexible pad 4 is directed to the switch on the seat belt buckle 5.

The user may hold the bracket gripping handle 102 and the lever arm gripping handle 201 with one hand and exert force inward to force the lever arm 2 to rotate around the connecting shaft component 3, thereby the clamping space is decreased and the switch of the seat belt buckle 5 is triggered to release the seat belt.

Finally, it should be noted: the above mentioned embodiments are only specific embodiments of the present application, and are used to explain the technical solution of the present application rather than limiting the present application. The scope of protection of the present application is not limited thereto. While the present application has been described in detail with reference to the above embodiments, those of ordinary skill in the art should understand that any skilled person in the art can still make modifications or easily envisage variations to the technical solution described in the above embodiments, or make equivalent replacements to some technical features therein within the technical scope disclosed in the present application; however, such modifications, variations or replacements do not make the essence of corresponding technical solutions deviate from the spirit and scope of the technical solution in the embodiments of the present application, and should be deemed as falling in the scope of protection of the present application. Therefore, the scope of protection of the present application shall be subject to the scope of protection of the claims.

The invention claimed is:

1. An auxiliary release device of safety belt buckle, comprising a bracket, a lever arm and a
   connecting shaft component, wherein
      the bracket comprises a U-shaped or C-shaped bracket body and a bracket gripping handle, the bracket body is substantially arranged at an angle of 90° with respect to the bracket gripping handle;

the lever arm comprises a lever arm gripping handle and an extension portion, the lever arm gripping handle is substantially arranged at an angle of 90° with respect to the extension portion;

the bracket body is provided with a bracket pivot hole, the bracket pivot hole is arranged on a first side of bracket body where the bracket body is connected with the bracket gripping handle;

the extension portion is provided with a lever arm pivot hole, the lever arm pivot hole is arranged at a first end of the extension portion where the extension portion is connected with the lever gripping handle; and wherein the extension portion is connected with the lever arm gripping handle on an outer surface of the extension portion, a second end of extension portion is provided with a protrusion, and the protrusion is connected with the extension portion on an inner surface of the extension portion; and the bracket and the lever arm are hinged at the positions of the bracket pivot hole and the lever arm pivot hole via the connecting shaft component, so that the bracket gripping handle and the lever arm gripping handle are located at the same side of the bracket body, a second end of extension portion and the bracket gripping handle are located at the same side of the first end of extension portion, and the second end of extension portion away from the first end of extension portion can enter the U-shaped or C-shaped space of the bracket body.

2. The auxiliary release device of safety belt buckle according to claim 1, wherein the bracket is provided with a perforation arranged on the first side of bracket body, and a portion between the first end of extension portion and the second end of extension portion can pass through the perforation entirely.

3. The auxiliary release device of safety belt buckle according to claim 1, wherein the protrusion extends from the inner surface of the extension portion into the U-shaped or C-shaped space of the bracket body.

4. The auxiliary release device of safety belt buckle according to claim 3, wherein the protrusion is substantially arranged at an angle of 90° with respect to the extension portion, so that the extension direction of the protrusion is substantially parallel to the extension direction of the lever arm gripping handle.

5. The auxiliary release device of safety belt buckle according to claim 3, wherein a terminal end of the protrusion is provided with a flexible pad.

6. The auxiliary release device of safety belt buckle according to claim 1, wherein the bracket pivot hole is arranged at a position away from a terminal end of the first side of bracket body, and the terminal end of the first side of bracket body terminates the first side of bracket body.

7. The auxiliary release device of safety belt buckle according to claim 1, wherein the length of the lever arm gripping handle is greater than the length of the extension portion.

8. The auxiliary release device of safety belt buckle according to claim 7, wherein the length of the lever arm gripping handle is equal to the length of the bracket gripping handle.

9. The auxiliary release device of safety belt buckle according to claim 1, wherein the lever arm gripping handle bends towards a direction away from the bracket gripping handle.

* * * * *